(12) United States Patent
Furukawa

(10) Patent No.: US 11,683,225 B2
(45) Date of Patent: Jun. 20, 2023

(54) RELAY DEVICE AND NON-TRANSITORY COMPUTER READABLE MEDIUM

(71) Applicant: FUJIFILM Business Innovation Corp., Tokyo (JP)

(72) Inventor: Yasuyuki Furukawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 697 days.

(21) Appl. No.: 16/558,165

(22) Filed: Sep. 2, 2019

(65) Prior Publication Data

US 2020/0287789 A1   Sep. 10, 2020

(30) Foreign Application Priority Data

Mar. 6, 2019   (JP) .............................. JP2019-040209

(51) Int. Cl.
| | |
|---|---|
| *H04L 41/0816* | (2022.01) |
| *H04L 41/0873* | (2022.01) |
| *H04L 45/745* | (2022.01) |
| *H04L 12/46* | (2006.01) |
| *H04L 45/021* | (2022.01) |
| *H04L 41/08* | (2022.01) |

(52) U.S. Cl.
CPC ...... *H04L 41/0816* (2013.01); *H04L 12/4641* (2013.01); *H04L 41/0873* (2013.01); *H04L 41/0886* (2013.01); *H04L 45/021* (2013.01); *H04L 45/745* (2013.01)

(58) Field of Classification Search
CPC . H04L 45/021; H04L 45/745; H04L 12/4641; H04L 41/0816
See application file for complete search history.

(56) References Cited

U.S. PATENT DOCUMENTS

| | | | | |
|---|---|---|---|---|
| 7,869,803 | B2 * | 1/2011 | Corson | ................... H04W 8/12 455/433 |
| 8,527,616 | B2 * | 9/2013 | Kitani | ................. H04L 41/0816 370/254 |
| 10,742,557 | B1 * | 8/2020 | Miriyala | ................. H04L 49/70 |
| 2015/0381444 | A1 * | 12/2015 | Nainar | ................ H04L 43/0811 370/241.1 |

(Continued)

FOREIGN PATENT DOCUMENTS

| | | |
|---|---|---|
| JP | 2010-252261 | 11/2010 |
| JP | 2012-074862 | 4/2012 |
| JP | 2017028393 | 2/2017 |

OTHER PUBLICATIONS

"Office Action of Japan Counterpart Application" with English translation thereof, dated Nov. 8, 2022, p. 1-p. 3.

*Primary Examiner* — Todd L Barker
(74) *Attorney, Agent, or Firm* — JCIPRNET

(57) ABSTRACT

A relay device includes an acquisition unit that acquires, upon detection of a change of settings concerning a network environment of an external system or the relay device, information related to the change; a generation unit that generates setting change information for causing settings of the external system to match settings of the relay device with reference to the information acquired by the acquisition unit; and an information setting unit that causes the setting change information generated by the generation unit to be set in the external system by transmitting the setting change information to the external system.

8 Claims, 7 Drawing Sheets

(56) References Cited

U.S. PATENT DOCUMENTS

2016/0057050 A1\* 2/2016 Ostrom .................. H04L 45/00
                                                                370/392
2017/0142026 A1\* 5/2017 Klaedtke ................. H04L 47/41
2019/0166036 A1\* 5/2019 Tappin ................ H04L 41/0806

\* cited by examiner

RELAY DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-040209 filed Mar. 6, 2019.

BACKGROUND

(i) Technical Field

The present disclosure relates to a relay device and a non-transitory computer readable medium.

(ii) Related Art

In a network environment in which a virtual private cloud (VPC) and a router are connected, network settings of one of the VPC and the router need be made in the other one of the VPC and the router and vice versa in a case where VPN connection is established between the VPC and the router.

For example, in a case where an IP address of the router is changed, conventionally, the changed IP address is set in the VPC, and the router acquires the changed IP address of the router from the VPC, for example, by receiving a notification from the VPC or making an inquiry to the VPC and sets the changed IP address in the router.

For example, in a case where a routing table of the VPC is changed, the router knows the change of the routing table, for example, by receiving a notification from the VPC or by making an inquiry to the VPC and requests the VPC to change the settings in a case where contents of the settings of the routing table are not appropriate. Japanese Patent No. 4721082 and Japanese Unexamined Patent Application Publication No. 2010-252261 are examples of related art.

SUMMARY

Aspects of non-limiting embodiments of the present disclosure relate to allowing a device to operate at its own initiative to eliminate inconsistency of settings between an external system and the device that occurs due to a change of settings concerning a network environment of the external system or the device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a relay device including an acquisition unit that acquires, upon detection of a change of settings concerning a network environment of an external system or the relay device, information related to the change; a generation unit that generates setting change information for causing settings of the external system to match settings of the relay device with reference to the information acquired by the acquisition unit; and an information setting unit that causes the setting change information generated by the generation unit to be set in the external system by transmitting the setting change information to the external system.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure is described below with reference to the drawings.

Figure 1:
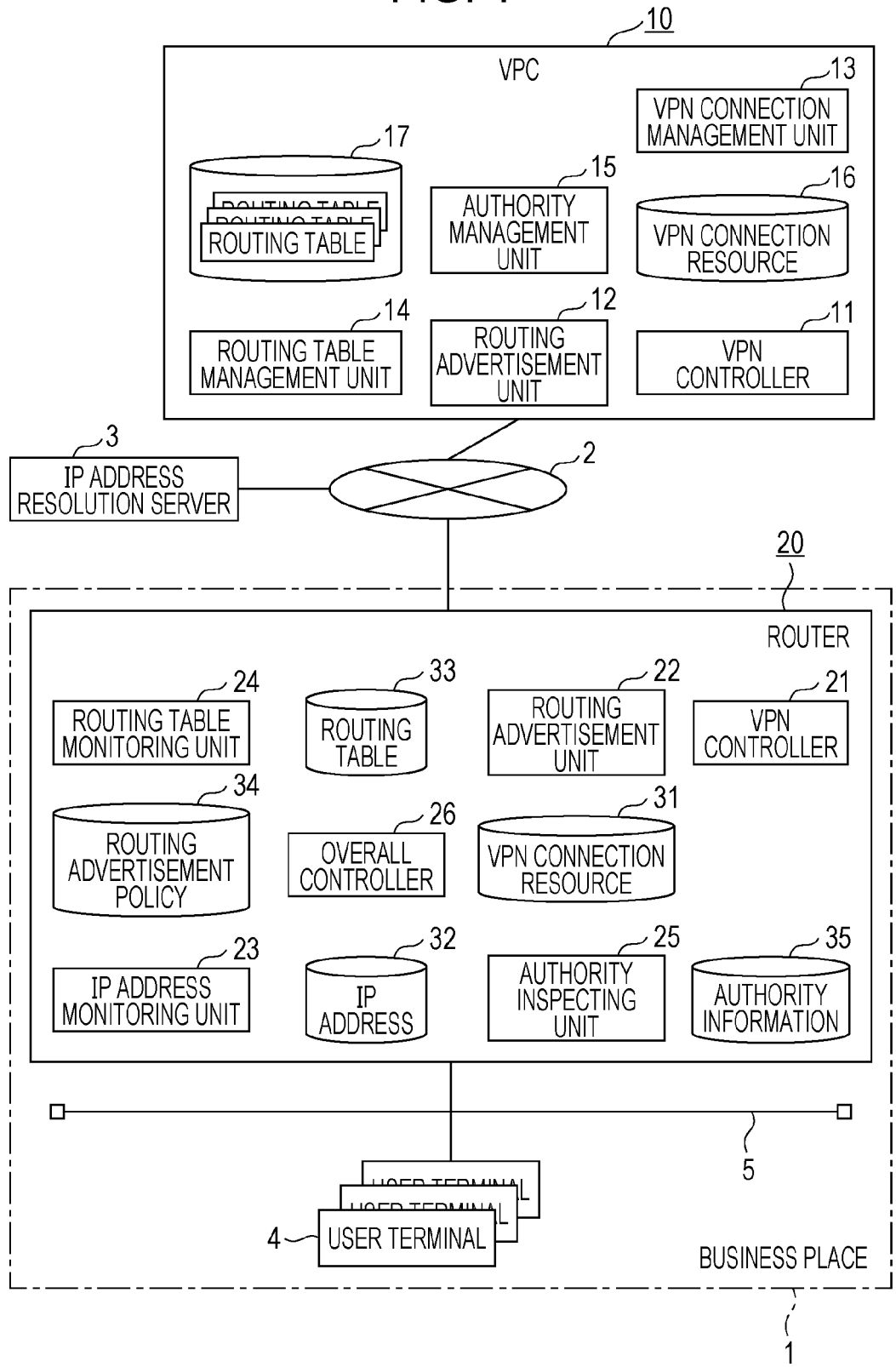
FIG. 1 illustrates an overall configuration and a block configuration of a network system according to the present exemplary embodiment.

FIG. 1 illustrates an overall configuration and a block configuration of a network system according to the present exemplary embodiment. The network system according to the present exemplary embodiment is configured such that a VPC 10, a router 20 installed in a business place 1, and an IP address resolution server 3 are connected over an Internet 2. The VPC 10 and the router 20 are connected over a virtual private network (VPN). The "VPN" refers to a technique for expanding a private network (in the present exemplary embodiment, a network that forms the VPC 10 and a network of a local system in the business place 1) over the Internet 2 and to the network.

The IP address resolution server 3 returns an IP address of the router 20 that makes an inquiry in response to the inquiry from the router 20. The "IP address" used in the description of the present exemplary embodiment is a global IP address given to the router 20 by an Internet service provider (ISP) of the router 20. The VPC 10 uses, as address information of the router 20, the global IP address given to the router 20 by the ISP of the router 20. That is, the VPC 10 designates the IP address as a destination of data to be transmitted to the router 20. The IP address resolution server 3 can be, for example, a Session Traversal Utilities for NATs (STUN) server. It is also possible to make efficient use of an existing STUN server.

It is assumed that an IP address used in the present exemplary embodiment is compliant with Internet Protocol version 4 (IPv4) and a private IP address is used as the IP address of the router 20. The IP address resolution server 3 need be connected to the Internet 2 in order to acquire the IP address of the router 20, for example, from the ISP and notify the router 20 about the IP address of the router 20. In a network environment in which the IP address used by the router 20 is compliant with Internet Protocol version 6 (IPv6) and not a private IP address but a global IP address can be used as the IP address of the router 20, the IP address resolution server 3 is not necessarily needed.

In the business place 1, a local system in which the router 20 and one or more user terminals 4 are connected to a local area network (LAN) 5 is constructed. The user terminal 4 can access the VPC 10 that is an external system through the router 20. Although the routers 20 provided in plural business places are connectable to the VPC 10, only a single business place 1 is illustrated in FIG. 1 since a similar local system having a router is constructed in each business place.

The VPC 10 is constituted by one or more server computers. The VPC 10 has a VPN controller 11, a routing advertisement unit 12, a VPN connection management unit 13, a routing table management unit 14, an authority management unit 15, a VPN connection resource storage unit 16, and a routing table storage unit 17. Constituent elements that are not used for description of the present exemplary embodiment are omitted in FIG. 1.

The VPN controller 11 employs a Security Architecture for Internet Protocol (IPsec) and controls VPN connection with the router 20. The "VPN connection" refers to connecting two networks, in the present exemplary embodiment, the network on the VPC 10 side and the network of the local system on the business place 1 side over a VPN.

The routing advertisement unit 12 employs a Border Gateway Protocol (BGP) and controls advertisement of routing information. The VPN connection management unit 13 manages information necessary for VPN connection control in the VPN controller 11 and routing information advertisement control in the routing advertisement unit 12, for example, by exchanging information with the router 20. The authority management unit 15 manages an authority given to the router 20.

The VPN connection management unit 13, the routing table management unit 14, and the authority management unit 15 are each provided with sharable software according to an Application Programming Interface (API). In the present exemplary embodiment, this software is referred to as an "API". Functions of each API are described together with description of operation.

In the VPN connection resource storage unit 16, information concerning a VPN connection resource managed by the VPN connection management unit 13 is stored. In the routing table storage unit 17, one or more routing tables referred to for routing of the VPC 10 are stored. The "routing table" has a table-like data structure that holds a list of routes to destinations of individual networks. A routing table is generated for each subnet. The "routing" is also called "routing control" and refers to control for deciding a data delivery route on a computer network to transfer data (generally called an "(IP) packet") to a destination on the Internet.

The VPC 10 according to the present exemplary embodiment can be constituted by constituent elements similar to those of an existing VPC 10.

The router 20 is a network device that connects different networks, in the present exemplary embodiment, the Internet 2 and the local system of the business place 1 and is a relay device that relays a packet exchanged between the Internet 2 and the local system. The router 20 according to the present exemplary embodiment have a hardware configuration of a conventional general-purpose router 20. That is, the router 20 has a computer and is therefore provided with a CPU, a ROM, a RAM, a storage serving as a storage unit, and a network interface serving as a communication unit that performs data communication over the Internet 2. Since the router 20 need receive information entered by a user as described later, the router 20 has a network interface as a communication unit that receives the information over a network such as the LAN 5 or a user interface as an input output unit.

The router 20 has a VPN controller 21, a routing advertisement unit 22, an IP address monitoring unit 23, a routing table monitoring unit 24, an authority inspecting unit 25, a VPN connection resource storage unit 31, an IP address storage unit 32, a routing table storage unit 33, a routing advertisement policy storage unit 34, and an authority information storage unit 35. Constituent elements that are not used for description of the present exemplary embodiment are omitted in FIG. 1.

The VPN controller 21 and the routing advertisement unit 22 have processing functions equivalent to the VPN controller 11 and the routing advertisement unit 12 of the VPC 10. The VPN controller 21 controls VPN connection with the VPN controller 11 in accordance with IPsec. The routing advertisement unit 22 controls routing advertisement with the routing advertisement unit 12 in accordance with the BGP. The IP address monitoring unit 23 acquires the IP address of the router 20 that is one of settings concerning a network environment of the router 20 by making an inquiry to the IP address resolution server 3. As described earlier, the IP address monitoring unit 23 is unnecessary in a case where the router 20 uses an IP address compliant with IPv6 and a global IP address is also used in the local system.

The routing table monitoring unit 24 monitors settings of a routing table set in the VPC 10, acquires a list (hereinafter referred to as a "routing table list") of routing tables that are one of settings concerning a network environment of the VPC 10, and requests the VPC 10 to change the routing table in accordance with a routing advertisement policy in a case where the routing table list is changed. The authority inspecting unit 25 checks whether or not an authority acquired from the VPC 10 is excessive by inspecting an operation authority on the VPC 10 given to the router 20 by the VPC 10. An overall controller 26 controls operation of the whole router 20 in cooperation with the constituent elements 21 through 25.

In the VPN connection resource storage unit 31, information concerning a VPN connection resource managed by the overall controller 26 is stored, similarly to the VPN connection resource storage unit 16 of the VPC 10. In the routing table storage unit 33, a routing table in the router 20 is stored. In the routing advertisement policy storage unit 34, a routing advertisement policy entered in advance by a user (e.g., a network administrator of the business place 1) is stored. In the authority information storage unit 35, authority information acquired from the VPC 10 is stored.

Each of the constituent elements 21 through 26 of the router 20 is realized by cooperative operation of the computer provided in the router 20 and a program operating in the CPU mounted in the computer. Each of the storage units 31 through 35 is realized by the storage mounted in the router 20. Alternatively, a RAM or an external storage unit may be used over a network.

A program used in the present exemplary embodiment may be provided by a communication unit or may be provided by being stored in a computer-readable recording medium such as a USB memory. The program provided by the communication unit or the recording medium is installed in a computer, and various processes are realized by sequential execution of the program by a CPU of the computer.

Next, operation of the router 20 in the present exemplary embodiment is described.

Figure 2:
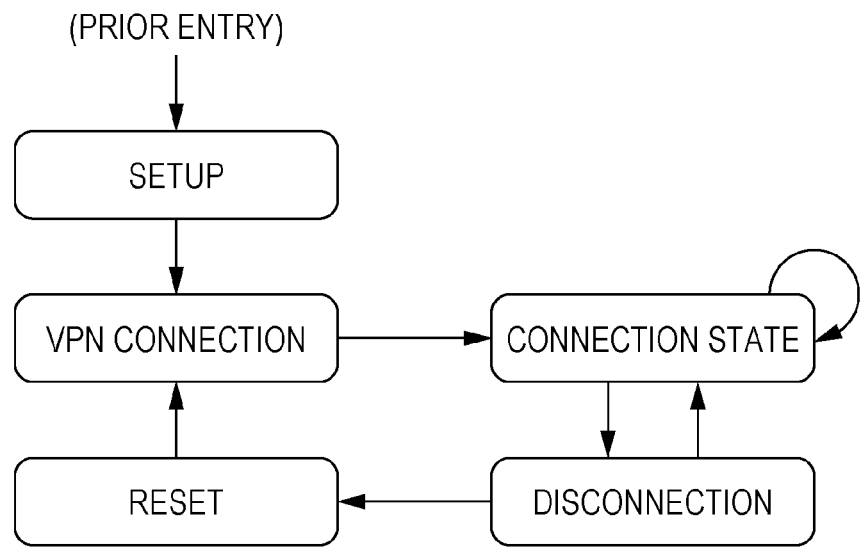
FIG. 2 illustrates transition of a state of a router according to the present exemplary embodiment.
Figure 3:
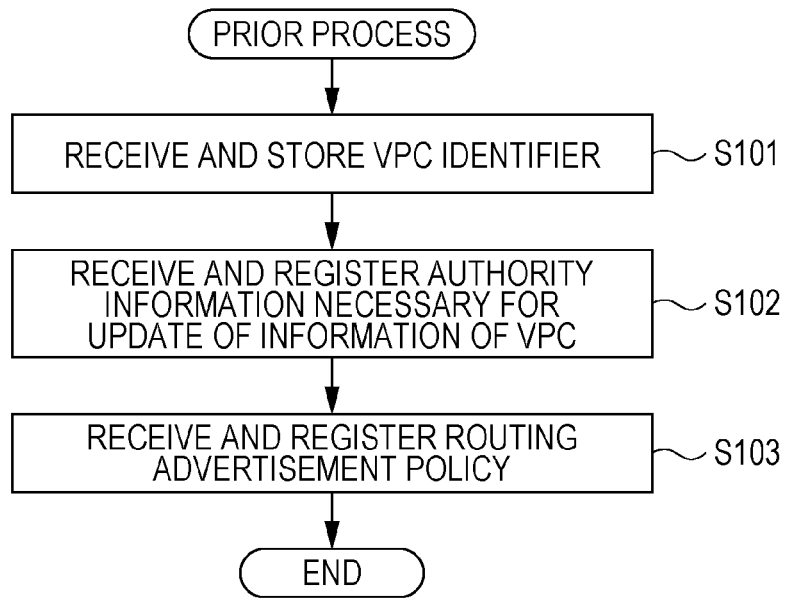
FIG. 3 is a flowchart illustrating a prior process according to the present exemplary embodiment.

FIG. 2 illustrates transition of a state of the router 20 according to the present exemplary embodiment. The router 20 performs processes that will be described later in accordance with the state. When the router 20 is powered on, it is necessary for a network administrator or the like (hereinafter referred to as a "user") in the business place 1 to establish VPN connection, enter information necessary for data communication with the VPC 10, and set the information in the router 20 before the processes are performed. The following describes a prior process for receiving information entered by the user and registering the information in a predetermined storage region of the router 20 with reference to the flowchart illustrated in FIG. 3. The user acquires the entered information in advance, for example, from the VPC 10.

The user enters information concerning the VPC 10 as necessary information. First, when the user enters a VPC identifier, the overall controller 26 receives the entered VPC identifier and stores the entered VPC identifier therein (step 101). The VPC identifier is identification information for identifying the VPC 10 that is a target of VPN connection.

Next, when the user enters authority information, the overall controller 26 receives the entered authority information and registers the entered authority information in the authority information storage unit 35 (step 102). The authority information is information for setting an authority (e.g., a read and write authority) including a write authority in the router 20 and is information necessary for update of information in the VPC 10. The authority information is, for example, information, such as an ID and a password on the VPC 10 side, necessary for writing information in a predetermined storage region of the VPC 10. The information in the VPC 10 is information set in the VPN connection resource storage unit 16 and the routing table storage unit 17.

The VPN connection management unit 13, the routing table management unit 14, and the authority management unit 15 each provide an API, and the authority information includes an authority to use these APIs.

Next, when the user enters a predetermined routing advertisement policy, the overall controller 26 receives the entered routing advertisement policy and registers the entered routing advertisement policy in the routing advertisement policy storage unit 34 (step 103). The routing table used in routing control in the VPC 10 is set in accordance with the routing advertisement policy (also referred to as a "routing policy") designated in the router 20.

Although the user enters the VPC identifier, the authority information, and the routing advertisement policy as described above, these three pieces of information need not be entered in the aforementioned order.

Figure 4:
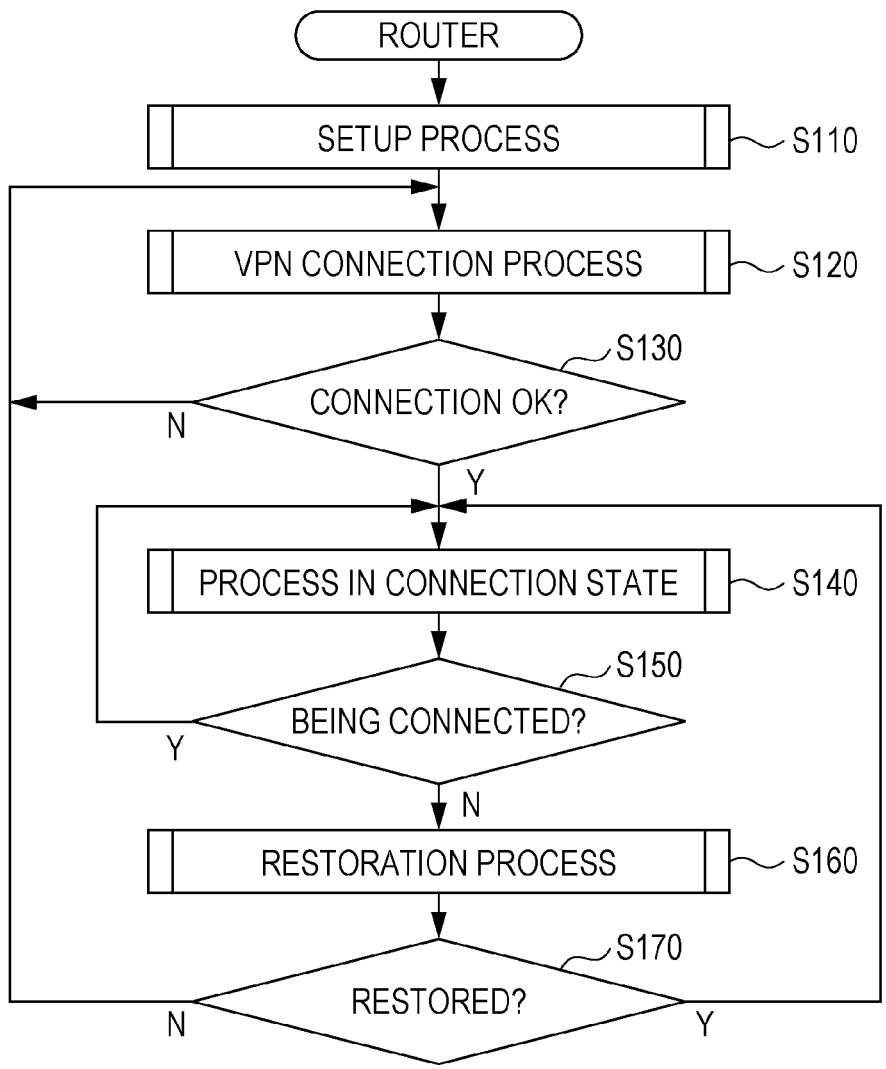
FIG. 4 is a flowchart illustrating a process executed by the router according to the present exemplary embodiment.

When the user enters the necessary information in advance as described above, VPN connection becomes possible, and then the router 20 starts operating under control of the overall controller 26. Processes performed by the router 20 are described with reference to the flowchart illustrated in FIG. 4.

Figure 5:
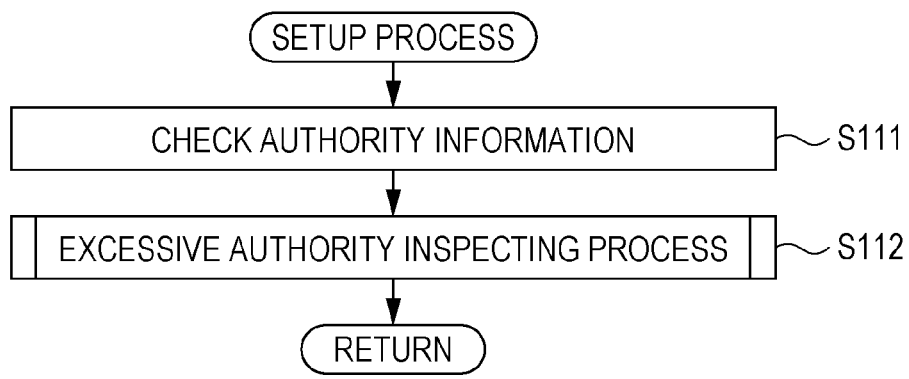
FIG. 5 is a flowchart illustrating a setup process according to the present exemplary embodiment.

The router 20 executes setup after the user enters the information in advance as illustrated in FIG. 2. A setup process (step 110) performed in this state is described below with reference to the flowchart illustrated in FIG. 5.

First, the router 20, in which settings of the network of the VPC 10 and an authority to use the APIs are set in the prior process, checks whether or not authority information is correctly set in the prior process (step 111). Specifically, the router 20 checks whether or not reading and writing of the VPN connection resource storage unit 16 and the routing table storage unit 17 on the VPC 10 side are possible and whether or not the APIs are available.

Figure 6:
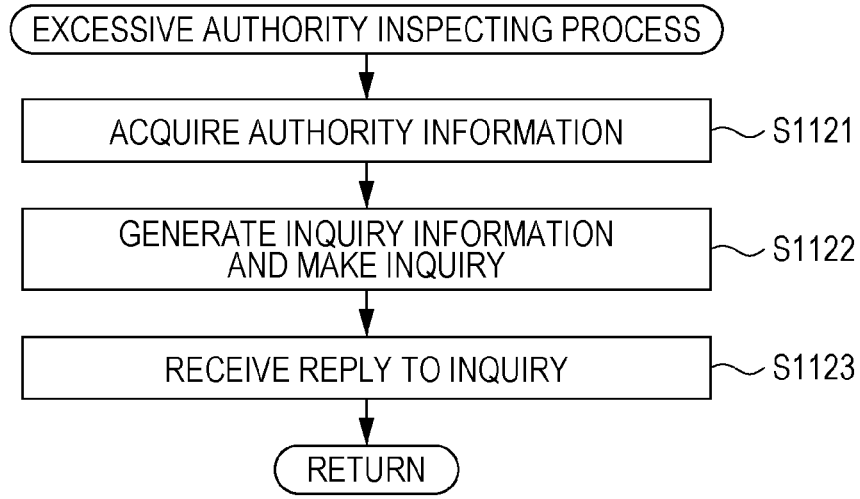
FIG. 6 is a flowchart illustrating an excessive authority inspecting process according to the present exemplary embodiment.

Meanwhile, the router 20 executes an excessive authority inspecting process for checking whether or not the operation authority given to the router 20 by the VPC 10 is more than necessary (step 112). The excessive authority inspecting process executed by the authority inspecting unit 25 is described below with reference to the flowchart illustrated in FIG. 6.

First, the authority inspecting unit 25 acquires authority information set in the authority information storage unit 35 upon receipt of an instruction to inspect an excessive authority from the overall controller 26 (step 1121). Then, the authority inspecting unit 25 generates inquiry information including a list of operation authorities whose permission should not be given to the router 20, in other words, unnecessary authorities with reference to the acquired authority information and makes an inquiry by using the API provided by the authority management unit 15 (step 1122). For example, authorities such as an authority to delete a virtual server and an authority to delete information set by another router are authorities unnecessary for the router 20.

The authority management unit 15 gives a reply as for contents of the inquiry, i.e. whether or not each authority is permitted in response to the inquiry. In this way, the API of the authority management unit 15 gives a reply as for whether or not the sender of the inquiry has been given the operation authorities included in the list of authorities, in other words, whether the sender of the inquiry is permitted to perform or prohibited from performing operations based on the operation authorities.

The authority inspecting unit 25 receives the reply from the authority management unit 15 (step 1123). In a case where the reply from the authority management unit 15 concerning the list of operation authorities whose permission should not be given includes even a single permitted operation authority, the authority inspecting unit 25 determines that this operation authority is excessive. If an unnecessary operation authority has been given, the authority inspecting unit 25 requests the authority management unit 15 to delete the operation authority.

Even if the router 20 instructs the VPC 10 to delete information A stored in the VPC 10 because the router 20 goes out of control due to occurrence of an abnormality, the information A is not deleted by the router 20 unless the router 20 has an authority to delete the information A.

A process that can be performed without information acquired in a stage that follows the setup process, for example, the IP address of the router 20 acquired in the VPN connection process may be included in the setup process.

Figure 7:
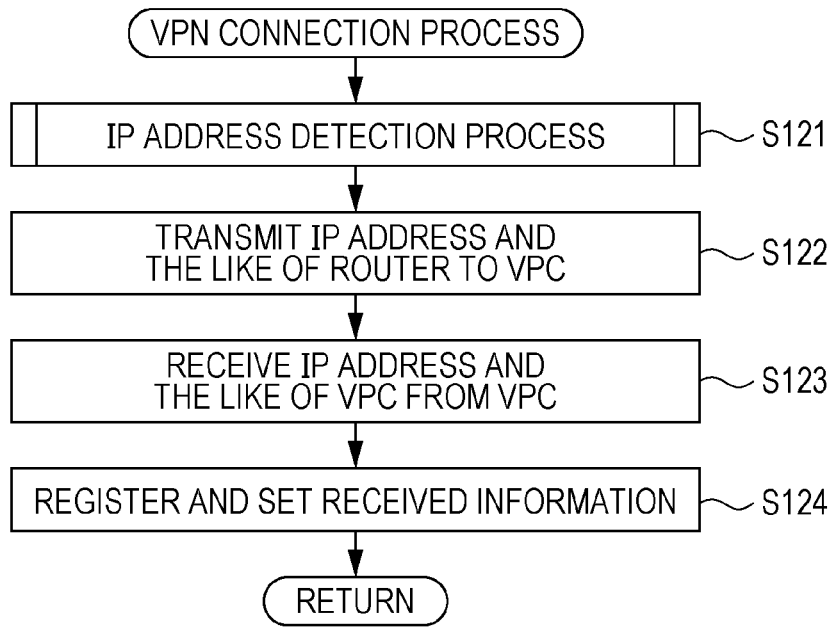
FIG. 7 is a flowchart illustrating a VPN connection process according to the present exemplary embodiment.

When the setup process described above is finished, the router 20 shifts from a state of setup to a state of VPN connection, and the overall controller 26 executes the VPN connection process. The following describes the VPN connection process according to the present exemplary embodiment with reference to the flowchart illustrated in FIG. 7.

Figure 8:
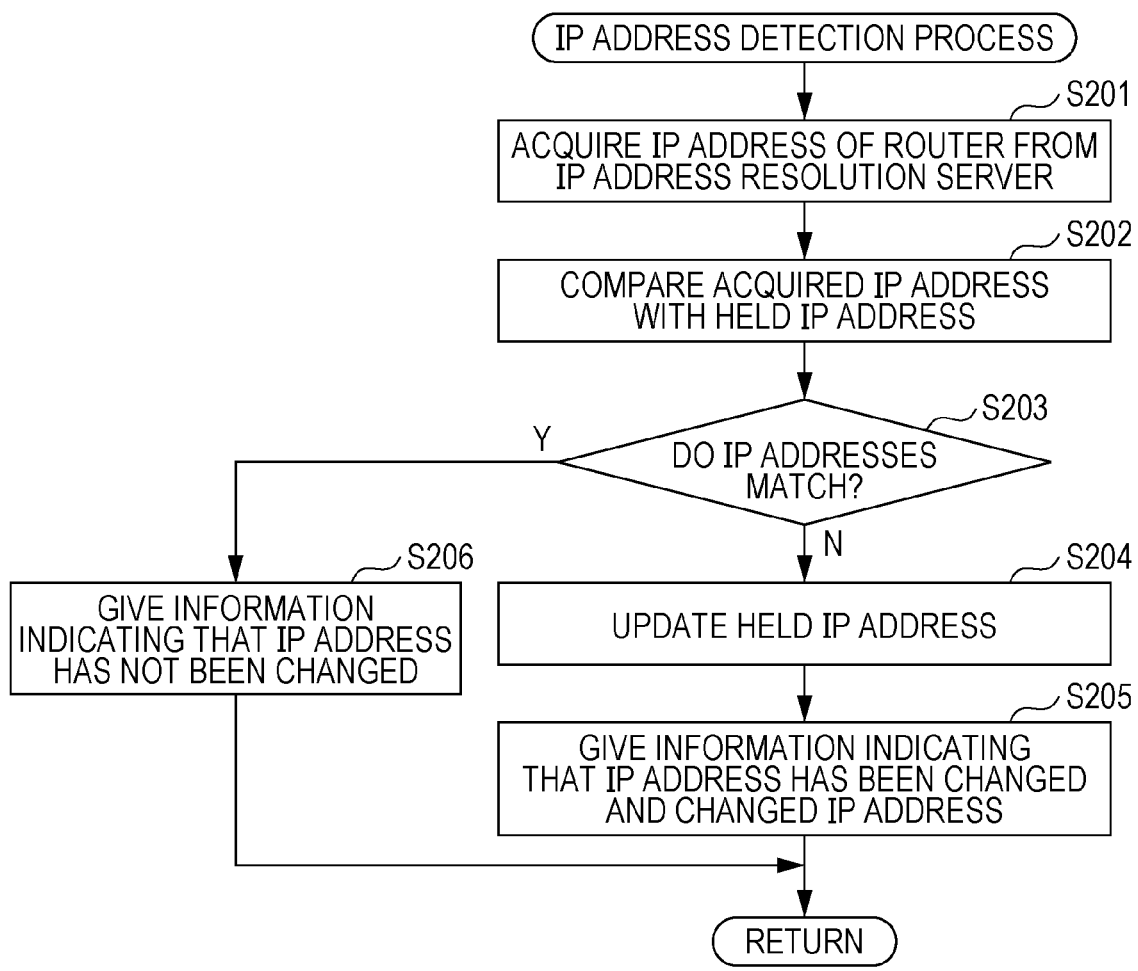
FIG. 8 is a flowchart illustrating an IP address detecting process according to the present exemplary embodiment.

First, the IP address monitoring unit 23 executes an IP address detection process in order to acquire a current IP address of the router 20 in accordance with an instruction from the overall controller 26 (step 121). This IP address detection process is described with reference to the flowchart illustrated in FIG. 8.

The IP address monitoring unit 23 first acquires a current IP address of the router 20 by making an inquiry to the IP address resolution server 3 (step 201). Then, the IP address monitoring unit 23 compares the acquired IP address with an IP address held in the IP address storage unit 32 (step 202).

In a case where the IP addresses match each other (Y in step 203), the IP address monitoring unit 23 returns a notification indicating that the IP address of the router 20 has not been changed to the overall controller 26 (step 206). Meanwhile, in a case where the IP addresses do not match each other (N in step 203), the IP address monitoring unit 23 updates the IP address held in the IP address storage unit 32 to the acquired IP address (step 204) and returns information indicating that the IP address has been changed and the updated IP address to the overall controller 26 (step 205).

Since the router 20 is not connected to the Internet 2 at a time of execution of the process immediately after the setup described here, the ISP gives a new IP address to the router 20. Accordingly, the overall controller 26 acquires a new IP address from the IP address monitoring unit 23.

When the overall controller 26 acquires the updated IP address, the overall controller 26 generates setting change information, such as the IP address of the router 20, necessary for settings of IPsec VPN and BGP on the VPC 10 side and transmits the setting change information through the API provided by the VPN connection management unit 13 of the VPC 10 (step 122).

When the VPN connection management unit 13 receives setting change information transmitted from the router 20, the VPN connection management unit 13 stores the setting change information in the VPN connection resource storage unit 16. Then, the VPN connection management unit 13 causes information necessary for VPN connection such as IPsec VPN to be set in the VPN controller 11 and causes routing control information necessary for settings of BGP included in the setting change information to be set in the routing advertisement unit 12.

Since the router 20 causes the IP address of the router 20 and the like to be written into the VPN connection resource storage unit 16 by transmitting the IP address of the router 20 and the like to the VPC 10, a write authority need be set in the router 20 in the prior process in a case where the write authority is not set in the router 20 before execution of this process.

Furthermore, the VPN connection management unit 13 transmits information necessary for settings of IPsec VPN and BGP on the router 20 side such as an IP address, a BGP AS number, and the router ID of the VPC 10 through the API. In this way, the API of the VPN connection management unit 13 stores the information transmitted from the router 20 in a VPN connection resource and returns the information on the VPC 10 to a transmission source.

When the overall controller 26 receives the information transmitted from the VPN connection management unit 13 (step 123), the overall controller 26 stores the information in the VPN connection resource storage unit 31. Then, the overall controller 26 causes the information necessary for VPN connection such as IPsec VPN to be set in the VPN controller 21 and causes routing control information necessary for settings of BGP to be set in the routing advertisement unit 22 (step 124).

By thus setting the information necessary for VPN connection and routing control in both of the VPC 10 and the router 20, the VPC 10 and the router 20 are connected over a VPN, but if the VPN connection fails (N in step 130), the VPN connection process is performed again.

A conventional router operates so as to acquire a changed IP address, for example, by waiting for a notification from the VPC or making an inquiry to the VPC in a case where the IP address of the router is changed. That is, a conventional router does not operate at its own initiative, for example, does not inquire the IP address resolution server 3 about a change of the IP address by itself and acquire the changed IP address directly from the IP address resolution server 3 not through a VPC in a case where the IP address has been changed. It can be therefore said that the conventional router depends on the VPC. Meanwhile, the router 20 according to the present exemplary embodiment operates at its own initiative as described above. The "operate at its own initiative" as used herein refers to operating on its own without depending on the VPC 10 concerning settings of the IP address of the router 20. Specifically, the router 20 operates so as to inquire the IP address resolution server 3 about a change of the IP address by itself, acquires the changed IP address directly from the IP address resolution server 3 not through the VPC 10, and sets the changed IP address therein. As for settings on the VPC 10 side, the router 20 operates so as to transmit the IP address acquired by the router 20 to the VPC 10 and causes the IP address to be set in the VPC 10 without entrusting the VPC 10 with acquisition of the IP address. In this way, according to the present exemplary embodiment, the router 20 can operate at its own initiative to eliminate inconsistency between the IP address of the router 20 in the VPC 10 and the IP address set in the router 20.

Figure 9:
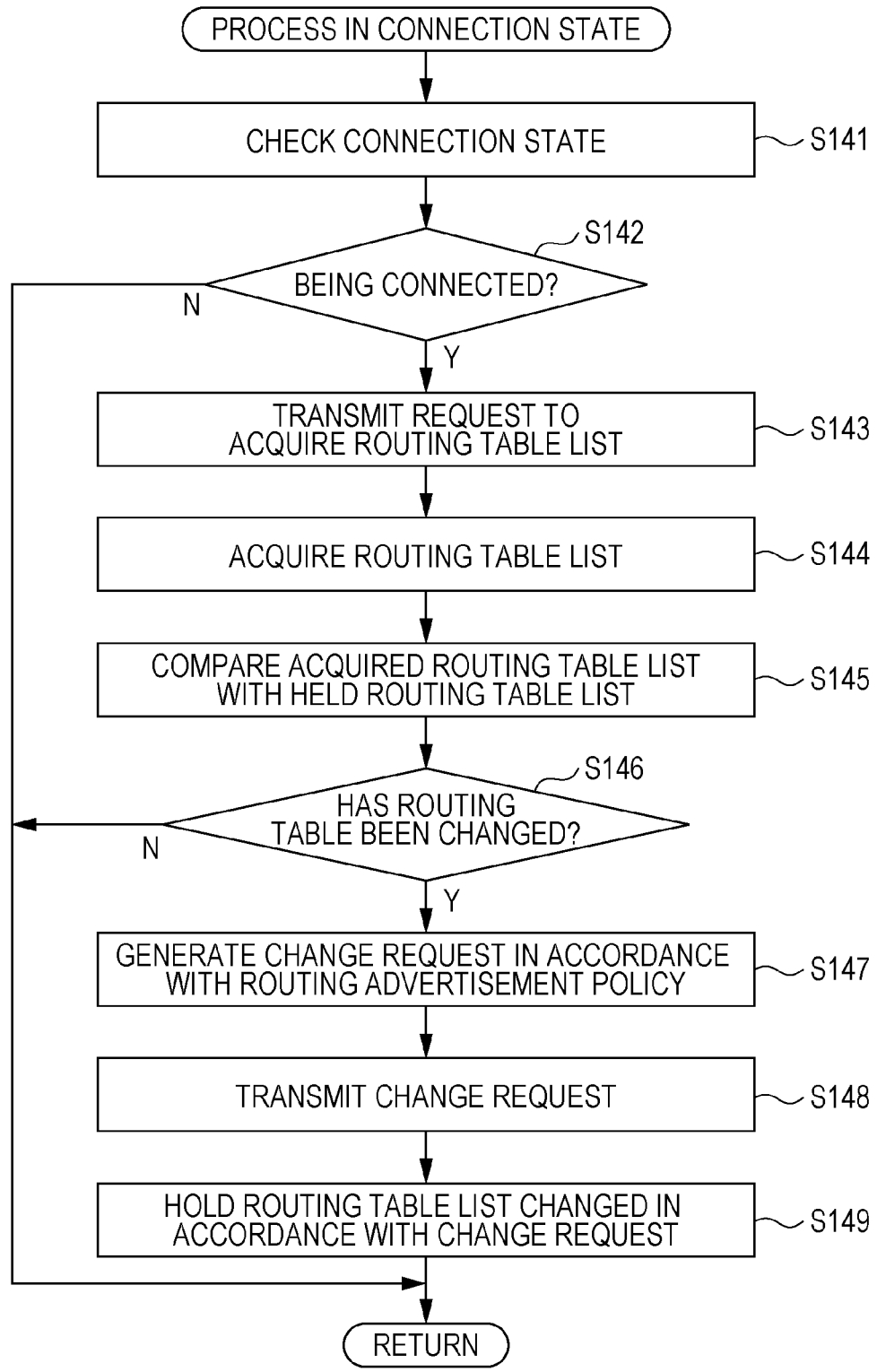
FIG. 9 is a flowchart illustrating a process in a connection state according to the present exemplary embodiment.

When VPN connection succeeds and VPN connection is established (Y in step 130), the router 20 shifts to a VPN connection state and executes a process in the connection state (step 140). The following describes the process in the connection state according to the present exemplary embodiment with reference to the flowchart illustrated in FIG. 9.

The overall controller 26 checks a state of connection with the VPC 10 by making an inquiry to the VPN controller (step 141). In a case where connection with the VPC 10 has been cut off (N in step 142), this process is finished. In a case where the router 20 is being connected to the VPC 10 (Y in step 142), the routing table monitoring unit 24 starts operation in accordance with an instruction from the overall controller 26. First, the routing table monitoring unit 24 transmits a request to acquire a list of routing tables through the API provided by the routing table management unit 14 of the VPC 10 (step 143).

The routing table management unit 14 generates and returns a list (i.e., a routing table list) of routing tables set in the routing table storage unit 17 in response to the request from the router 20 to acquire the list of routing tables. In this way, the API of the routing table management unit 14 returns the routing table list in response to the transmitted request to acquire the list.

In the routing table list, a routing table ID, a routing table name, and a routing advertisement flag of each routing table are set in association with one another. The routing table ID is identification information for identifying the routing table. The routing table name is a name given to the routing table. The routing advertisement flag is flag information indicating whether or not to reflect a result of BGP, in other words, whether or not to perform routing advertisement by using the routing table. In a case where the routing advertisement flag is active, routing advertisement is performed, and in a case where the routing advertisement flag is inactive, routing advertisement is not performed.

When the routing table monitoring unit 24 acquires the routing table list transmitted from the routing table management unit 14 (step 144), the routing table monitoring unit 24 compares the acquired routing table list with a routing table list held therein (step 145). The routing table list held therein is a routing table list held in step 149 that will be described later. In a case where the routing table lists match each other, i.e., in a case where the routing table has not been changed in the VPC 10 (N in step 146), this process is finished. Meanwhile, in a case where the routing table lists do not match each other, i.e., in a case where the routing table has been changed in the VPC 10 (Y in step 146), the routing table monitoring unit 24 decides for which of the routing tables designated in the received routing table list the routing advertisement flag is changed to be active or inactive by referring to the routing advertisement policy set in the routing advertisement policy storage unit 34 and generates a change request for requesting a change of settings of the routing advertisement flag of the routing table to be changed (step 147). The change request includes setting change information in which a setting change value (active or inactive) of the routing advertisement flag is associated with the routing table ID of the routing table to be changed. Then, the routing table monitoring unit 24 transmits the change request through the API provided by the routing table management unit 14 (step 148).

The routing table management unit 14 changes setting of the routing advertisement flag of the subject routing table among the routing tables set in the routing table storage unit 17 in accordance with the change request transmitted from the routing table monitoring unit 24. In this way, the API of the routing table management unit 14 changes setting of the routing table in accordance with the transmitted change request.

Then, the routing table monitoring unit 24 holds the acquired routing table list therein after changing the contents of the routing table list in accordance with the change request (step 149).

See FIG. 4 again. The overall controller 26 regularly repeats the process in the connection state described above while connection with the VPC 10 is being established (Y in step 150). This allows the router 20 to address the change of the routing table on the VPC 10 side in a case where contents of settings of the routing table storage unit 17 are updated, for example, in a case where the VPC 10 changes the configuration of the subnet or increases the number of routing tables while connection with the VPC 10 is being established.

A conventional router operates so as to address update of a routing table on a VPC side, for example, by waiting for a notification from the VPC without operating at its own initiative in a case where contents of settings of the routing table of the VPC are changed. Meanwhile, the router 20 according to the present exemplary embodiment can address the change of the routing table by operating at its own initiative. The "operating at its own initiative" as used herein refers to operating on its own without depending on the VPC 10 concerning settings of the routing table of the VPC 10. Specifically, the router 20 operates so as to detect a change of a routing table on its own by regularly transmitting a request to acquire a list of routing tables to the VPC 10 without waiting for a notification from the VPC 10. Furthermore, in a case where a change of a routing table is detected, the router 20 operates so as to request the VPC 10 to change settings of the routing advertisement flag of the changed routing table. In this way, according to the present exemplary embodiment, the router 20 can set the routing advertisement flag of the routing table in the VPC 10 to a flag value according to the routing advertisement policy of the router 20 by operating at its own initiative, thereby eliminating inconsistency between the routing advertisement policy and the routing table in the VPC 10.

Figure 10:
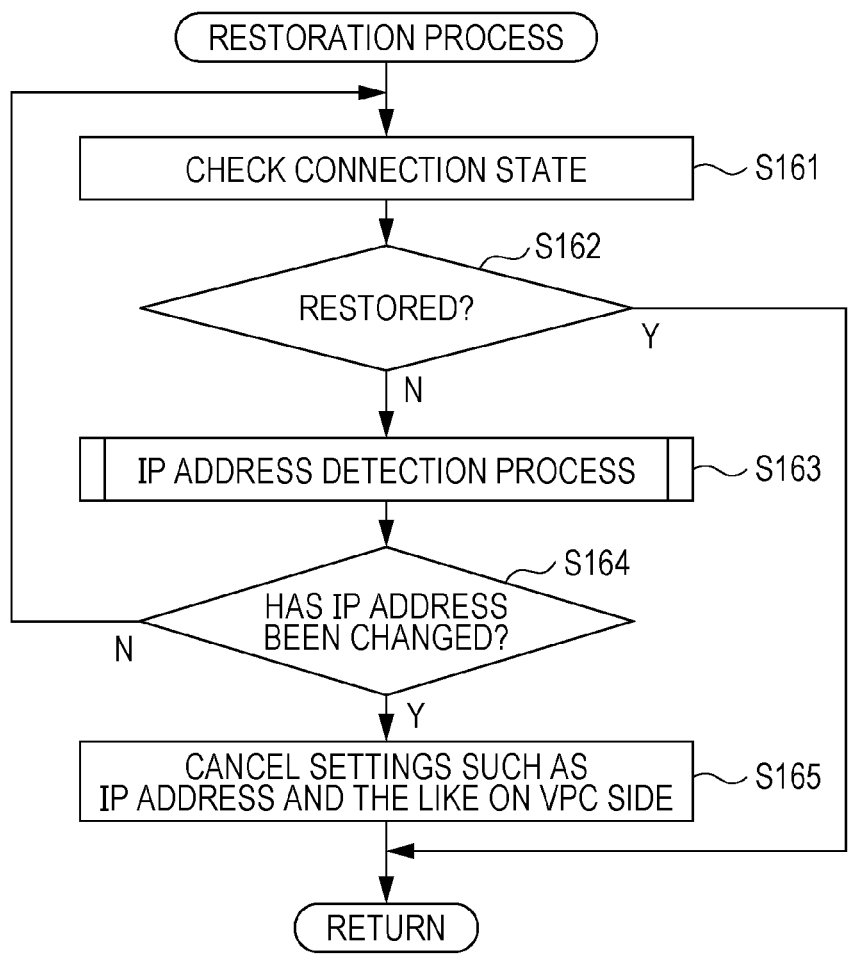
FIG. 10 is a flowchart illustrating a restoration process according to the present exemplary embodiment.

When connection with the VPC 10 is cut off (N in step 150), the router 20 shifts to a state of disconnection illustrated in FIG. 2. In this case, the overall controller 26 executes a restoration process in order to try restoration of VPN connection (step 160). The restoration process is described below with reference to the flowchart illustrated in FIG. 10.

The overall controller 26 checks a state of connection with the VPC 10 by making an inquiry to the VPN controller (step 161). In a case where the router 20 is connected to the VPC 10, i.e., in a case where the disconnected VPN has been restored (Y in step 162), this process is finished.

In a case where it is confirmed in the restoration process that the router 20 has been restored (Y in step 170), the router 20 returns to a connection state and shifts to the aforementioned process in the connection state (step 140).

Meanwhile, in a case where VPN connection has not been restored and connection with the VPC 10 continues to be cut off (N in step 162), the IP address monitoring unit 23 executes an IP address detecting process to acquire a current IP address of the router 20 in accordance with an instruction from the overall controller 26 (step 163). This IP address detecting process has been already described with reference to FIG. 8, and therefore description thereof is omitted.

In a case where the IP address monitoring unit 23 returns information indicating that the IP address has not been changed to the overall controller 26, i.e., in a case where the IP address has not been changed (N in step 164), step 161 is performed again.

Meanwhile, in a case where the IP address monitoring unit 23 returns information indicating that the IP address has been changed to the overall controller 26, i.e., in a case where the IP address has been changed (Y in step 164), VPN connection cannot be established unless the IP address of the router 20 set in the VPC 10 is changed. Accordingly, the overall controller 26 cancels settings of the VPN controller 11 and the routing advertisement unit 12 of the VPC 10 by requesting cancellation of settings through the API of the VPN connection management unit 13 (step 165). In accordance with this, the state of the router 20 shifts to "reset" illustrated in FIG. 2.

In a case where it is confirmed in the restoration process that the router 20 has not been restored (N in step 170), the router 20 shifts to a state of VPN connection to return to a connection state and shifts to the VPN connection process (step 120).

In the VPN connection process, the changed IP address is transmitted to the VPC 10 and is set in the VPN controller 11 as described above. As a result, the IP address of the router 20 set in the VPC 10 and the IP address of the router 20 set in the router 20 match each other, and VPN connection is established.

As described above, according to the present exemplary embodiment, even in a case where inconsistency occurs between information set in the VPC 10 and information set in the router 20 due to a change of the IP address of the router 20 or a change of the routing table of the VPC 10, the router 20 can operate at its own initiative to eliminate the inconsistency. In particular, in the present exemplary embodiment, there is no need to modify a VPN connection service of the VPC 10 in order to eliminate the inconsistency.

Although the IP address of the router 20 and the routing table of the VPC 10 have been described as an example of settings concerning a network environment in the present exemplary embodiment, the router 20 can try to eliminate inconsistency concerning other kind of settings by using an API prepared in the VPC 10.

Although VPN connection with the VPC 10 that is an example of an external system has been described, the external system is not limited to a VPC. Furthermore, network connection is not limited to a VPN.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A relay device comprising:
a processor, configured to:
acquire, upon detection of a change of settings concerning a network environment of an external system or the relay device, information related to the change;
generate setting change information for causing settings of the external system to match settings of the relay device with reference to the acquired information;
cause the generated setting change information to be set in the external system by transmitting the setting change information to the external system,
wherein in a case where the change of the settings concerning the network environment is a change of address information of the relay device used for network communication with the relay device by the external system, the processor acquires the address information of the relay device from a server connected to an Internet and sets the address information in the relay device, generates setting change information including the address information of the relay device, and transmits the setting change information to the external system, and
wherein in a case where the relay device has no write authority for setting the address information of the relay device in the external system, the processor acquires the write authority from the external system and sets the write authority in the relay device before transmitting the setting change information to the external system.

2. The relay device according to claim 1, wherein the processor is further configured to:
acquire address information of the external system set in the external system from the external system and set the address information of the external system in the relay device.

3. The relay device according to claim 1, wherein
in a case where the change of the settings concerning the network environment is a change of settings of a routing table held in the external system, the processor acquires the routing table from the external system and generates the setting change information by updating the acquired routing table in accordance with a preset routing advertisement policy.

4. The relay device according to claim 3, wherein the processor is further configured to:
cause routing control information set in the relay device to be set in the external system by transmitting the routing control information to the external system and cause the routing control information set in the external system to be set in the relay device by acquiring the routing control information set in the external system from the external system.

5. The relay device according to claim 1, wherein the processor is further configured to:
inspect an operation authority on the external system given to the relay device by the external system.

6. The relay device according to claim 5, wherein the processor is further configured to:
restrict the operation authority given to the relay device by the external system.

7. A non-transitory computer readable medium storing a program causing a computer to execute a process, the process comprising:
acquiring, upon detection of a change of settings concerning a network environment of an external system or a relay device, information related to the change;
generating setting change information for causing settings of the external system to match settings of the relay device with reference to the acquired information;
causing the generated setting change information to be set in the external system by transmitting the setting change information to the external system,
wherein in a case where the change of the settings concerning the network environment is a change of address information of the relay device used for network communication with the relay device by the external system, the process comprises acquiring the address information of the relay device from a server connected to an Internet and setting the address information in the relay device, generating change information including the address information of the relay device, and transmitting the setting change information to the external system, and
wherein in a case where the relay device has no write authority for setting the address information of the relay device in the external system, the process further comprises acquiring the write authority from the external system and setting the write authority in the relay device before transmitting the setting change information to the external system.

8. A relay device comprising:
acquisition means for acquiring, upon detection of a change of settings concerning a network environment of an external system or the relay device, information related to the change;
generation means for generating setting change information for causing settings of the external system to match settings of the relay device with reference to the information acquired by the acquisition means;
information setting means for causing the setting change information generated by the generation means to be set in the external system by transmitting the setting change information to the external system,
wherein in a case where the change of the settings concerning the network environment is a change of address information of the relay device used for network communication with the relay device by the external system, the acquisition means acquires the address information of the relay device from a server connected to an Internet and sets the address information in the relay device, the generation means generates setting change information including the address information of the relay device, and the information setting means transmits the setting change information to the external system; and write authority setting means for, in a case where the relay device has no write authority for setting the address information of the relay device in the external system, acquiring the write authority from the external system and setting the write authority in the relay device before the information setting means transmits the setting change information to the external system.

\* \* \* \* \*